United States Patent
Wittwer

(10) Patent No.: US 11,154,948 B2
(45) Date of Patent: Oct. 26, 2021

(54) LASER BEAM MACHINING DEVICE AND A PROCESS OF LASER MACHINING COMPRISING A SINGLE LENS FOR LIGHT FOCUSSING

(75) Inventor: Stefan Wittwer, Herzogenbuchsee (CH)

(73) Assignee: BYSTRONIC LASER AG, Niederoenz (CH)

( * ) Notice: Subject to any disclaimer, the term of this patent is extended or adjusted under 35 U.S.C. 154(b) by 1245 days.

(21) Appl. No.: 13/822,000

(22) PCT Filed: Nov. 28, 2011

(86) PCT No.: PCT/IB2011/055333
§ 371 (c)(1),
(2), (4) Date: Mar. 14, 2013

(87) PCT Pub. No.: WO2012/080883
PCT Pub. Date: Jun. 21, 2012

(65) Prior Publication Data
US 2013/0200052 A1    Aug. 8, 2013

Related U.S. Application Data

(60) Provisional application No. 61/423,992, filed on Dec. 16, 2010.

(30) Foreign Application Priority Data

Dec. 16, 2010  (EP) .................... 10195433

(51) Int. Cl.
*B23K 26/06* (2014.01)
*B23K 26/046* (2014.01)
(Continued)

(52) U.S. Cl.
CPC ........ *B23K 26/0648* (2013.01); *B23K 26/046* (2013.01); *B23K 26/0876* (2013.01); *B23K 26/1462* (2015.10)

(58) Field of Classification Search
CPC .... B23K 26/046; B23K 26/04; B23K 26/062; B23K 26/0648; B23K 26/064; B23K 26/073; B23K 26/0626
(Continued)

(56) References Cited

U.S. PATENT DOCUMENTS

| 4,689,467 A | 8/1987 | Inoue |
| 4,942,284 A | 7/1990 | Etcheparre et al. |

(Continued)

FOREIGN PATENT DOCUMENTS

| DE | 4129278 A1 | 7/1993 |
| DE | 4317384 A1 | 3/1994 |

(Continued)

OTHER PUBLICATIONS

International Search Report and International Preliminary Report on Patentability, dated Apr. 10, 2012, from parent PCT/IB2011/055333; in English.

(Continued)

*Primary Examiner* — Tu B Hoang
*Assistant Examiner* — Alba T Rosario-Aponte
(74) *Attorney, Agent, or Firm* — Workman Nydegger

(57) ABSTRACT

A laser beam machining device (1) is provided, in which unfocused light (A) from a light exit point (B) is radiated onto a single lens (8), where in the lens (8) focuses the laser light (A) and guides it onto a machining point of a work piece (7). A distance ($m_a$, $m_b$) between the lens (8) and the light exit point (B) and a distance ($l_a$, $l_b$) between the lens (8) and the machining point of the workpiece (7) and a distance between the light exit point (B) and the aforementioned machining point can be varied. Moreover, a process of usage of a laser beam machining device (1) is provided.

13 Claims, 5 Drawing Sheets

(51) Int. Cl.
*B23K 26/08* (2014.01)
*B23K 26/14* (2014.01)

(58) Field of Classification Search
USPC ............. 219/121.75, 121.6, 121.73, 121.78, 219/121.83, 121.79, 121.61, 121.62
See application file for complete search history.

(56) References Cited

U.S. PATENT DOCUMENTS

| | | | |
|---|---|---|---|
| 5,061,839 A | | 10/1991 | Tsukasa et al. |
| 5,207,673 A | * | 5/1993 | Ebling .................... A61B 18/24 385/33 |
| 5,245,682 A | * | 9/1993 | Ortiz, Jr. .................. G02B 6/32 385/33 |
| 5,298,716 A | | 3/1994 | Ogawa et al. |
| 5,332,881 A | | 7/1994 | Topkaya et al. |
| 5,607,606 A | * | 3/1997 | Mori .................... B23K 26/046 219/121.67 |
| 5,625,609 A | * | 4/1997 | Latta ....................... G11B 7/005 369/275.1 |
| 5,667,707 A | | 9/1997 | Klingel et al. |
| 5,815,626 A | * | 9/1998 | Kuba ................... B23K 26/032 385/123 |
| 6,124,565 A | | 9/2000 | Morishita et al. |
| 6,204,473 B1 | | 3/2001 | Legge |
| 6,777,641 B2 | * | 8/2004 | Cole, III ................ B23K 26/04 219/121.67 |
| 6,822,187 B1 | | 11/2004 | Hermann et al. |
| 7,745,756 B2 | | 6/2010 | Yamazaki et al. |
| 7,759,602 B2 | | 7/2010 | Mori et al. |
| 7,786,404 B2 | | 8/2010 | Menin et al. |
| 8,941,030 B2 | | 1/2015 | Nomaru |
| 2005/0115940 A1 | * | 6/2005 | Matsushita .......... B23K 26/705 219/121.83 |
| 2007/0278194 A1 | * | 12/2007 | Hoelsher ................ B23K 26/04 219/121.6 |
| 2010/0072182 A1 | * | 3/2010 | Caristan ............ B23K 26/0604 219/121.72 |
| 2010/0096370 A1 | | 4/2010 | Yamazaki et al. |
| 2010/0282725 A1 | * | 11/2010 | Johnson ............. B23K 26/0648 219/121.67 |
| 2011/0024404 A1 | | 2/2011 | Beletti |
| 2011/0028951 A1 | * | 2/2011 | Raksi ....................... A61F 9/008 606/4 |
| 2011/0056921 A1 | | 3/2011 | Beletti |

FOREIGN PATENT DOCUMENTS

| | | |
|---|---|---|
| DE | 19628857 A1 | 1/1998 |
| DE | 202007018689 U1 | 3/2009 |
| EP | 0352952 A2 | 1/1990 |
| EP | 0352952 A3 | 6/1991 |
| EP | 0536951 A2 | 4/1993 |
| EP | 0536951 A3 | 4/1993 |
| EP | 0950462 B1 | 8/2005 |
| EP | 1998215 A1 | 12/2008 |
| EP | 2042258 A1 | 4/2009 |
| EP | 2062676 A1 | 5/2009 |
| EP | 2062679 A1 | 5/2009 |
| EP | 1743726 B1 | 12/2009 |
| EP | 2018933 B1 | 11/2010 |
| FR | 2923168 A1 | 5/2009 |
| JP | S57-14490 | 1/1982 |
| JP | S59-215292 A | 12/1984 |
| JP | S63-273588 A | 11/1988 |
| JP | H03-142094 A | 6/1991 |
| JP | H04-284993 A | 10/1992 |
| JP | 06198477 A * | 7/1994 |
| JP | H06-198477 A | 7/1994 |
| JP | H07-132390 A | 5/1995 |
| JP | 2001-129679 A | 1/2001 |
| JP | 2002-283085 A | 10/2002 |
| JP | 2003-039187 A | 2/2003 |
| JP | 2004-111428 | 4/2004 |
| JP | 2005-150537 | 6/2005 |
| JP | 2006-035247 A | 2/2006 |
| JP | 2006-140356 | 6/2006 |
| WO | 2007/135460 A1 | 11/2007 |
| WO | 2008/019681 A1 | 2/2008 |
| WO | 2009/016645 A2 | 2/2009 |
| WO | 2009/016645 A3 | 9/2009 |
| WO | 2010/029243 A1 | 3/2010 |
| WO | 2011/027065 A1 | 3/2011 |

OTHER PUBLICATIONS

EPO Search Report and Written Opinion, from priority appl.No. EP10195433 of the present application; dated Aug. 3, 2011; in German.

Japanese Office Action, dated Sep. 6, 2016, received in counterpart Japanese Application JP2013-543915.

* cited by examiner

LASER BEAM MACHINING DEVICE AND A PROCESS OF LASER MACHINING COMPRISING A SINGLE LENS FOR LIGHT FOCUSSING

This application is a 35 U.S.C. 371 national-phase entry of PCT International application no. PCT/IB2011/055333 filed on Nov. 28, 2011 and also claims benefit of priority to prior European application no. EP10195433 filed on Dec. 16, 2010, and also claims priority as a non-provisional of U.S. provisional application ser. No. 61/423,992 filed on Dec. 16, 2010, and both European application no. EP10195433 and U.S. provisional application ser. No. 61/423,992, as well as parent PCT International application no. PCT/IB2011/055333, are all incorporated herein by reference in their entireties for all intents and purposes, as if identically set forth in full herein.

The invention relates to a laser beam machining device comprising a light exit point, which emits unfocused laser light, and a single lens after the light exit point in the direction of radiation, which focuses the laser light and is designed to guide the focused laser light onto a machining point of a workpiece and which is movable in said direction of radiation. Furthermore, the invention relates to the usage of a laser beam machining device.

Material processing with the aid of a laser has long been known. A highly energised light beam is directed onto a material and melts it, vaporizes it and/or burns it. Materials can thus be separated (laser cutting) and also joined (laser welding). For example, $CO_2$ lasers, disc lasers, Nd:YAG lasers, fibre lasers and recently also diode lasers are used for this purpose. An important point in the case of material processing using lasers is the focusing of the laser beam onto a focal spot.

For example, DE 202007018689U1 discloses a system for this purpose for actively adjusting the focus position in optical systems for high-energy laser radiation for laser beam machining of materials. This system consists of a sensor for detecting the focus position, a control processor and a movable shaft of the optical system for changing and correcting the focus position.

Further solutions for adjusting the focus position of a laser beam are disclosed in WO 2008/019681A1, US 2010/0096370A1, EP 2042258A1, WO 2009/016645A2, U.S. Pat. No. 7,786,404B2, EP 1998215A1 and EP 0536951A2.

Other documents describe laser beam machining heads which, in addition to a drive means for the focusing optical system, also comprise more or less complex compensation mechanisms in connection with the supply of working gas, cleaning gas and/or cooling gas. The principle of these compensation mechanisms is generally based on the fact that a change in pressure of the aforementioned auxiliary gases may lead to an undesired displacement of the focusing optical system. For example, an increase in the working or cutting gas below the focusing optical system leads to an increased pressure in the focusing optical system. The aim of such a compensation means is to compensate for this increase in pressure via piston surfaces acting in opposite directions.

In this type of laser beam machining device the drive means for the focusing optical system either consists of mechanical or hydraulic drives arranged outside the laser beam machining head, or is integrated in the walls of the laser beam machining head. The wall chambers are pressurised with fluid which in each case acts on a piston surface which is in turn connected to the focusing optical system or forms a part thereof.

These documents include, in particular, EP 1743726B1 and EP2018933B1, (both from Fanuc), EP 2062676A1 and EP 2062679A1 (both from the applicant) and DE 4317384A1, DE 4129278 A1, DE 19628857A1, U.S. Pat. No. 6,204,473B1, FR 2923168A1 and U.S. Pat. No. 6,204,473B1.

The drawback of such embodiments is that the compensation means require a lot of space and the drive means "puff out" the laser beam machining head and, as a result of their integration in the walls of the laser beam machining head, are not accessible for maintenance and repair works.

Furthermore, U.S. Pat. No. 5,815,626A discloses an optical transmission device for transmitting a laser beam, comprising an optical fibre with an graded index optical fibre, wherein a refraction index at a centre and at a peripheral section of said core of said optical fibre are different. Furthermore, the device comprises an optical fibre incident system having a smallest focused point at an incident side plane in said optical fibre through which the laser beam being introduced into said optical fibre or near said incident side plane of said optical fibre.

Moreover, JP 2001-129679 discloses an optical system, wherein the intensity distribution of an incident laser beam on an aspherical lens is converted through the aspherical lens arranged on the axis of the laser beam produced from the laser beam generator into such an intensity distribution that the energy intensity is skewed toward the circumferential area.

In addition, JP 2002-283085 discloses an aspherical lens at the outside of a resonator of a laser oscillator, wherein the curvature element of the aspherical lens is a sum of a convergent curvature element, which is uniform on the whole plane, and a divergent curvature element, which is proportional to the distribution of the beam intensity at the lens position. Moreover, the arrangement comprises a beam transmitting optical system, which is provided for guiding the laser beam transmitted from the aspherical lens to the machining point and copies the focal point position corresponding to the convergent spherical curvature element of the aspherical lens onto the machining point.

Finally, JP 2006-035247 discloses an optical system with an emitting part for emitting a laser beam around the optical axis centre and an aspherical lens arranged around the optical axis centre in front of the watt class one-chip semiconductor laser. An F value is varied by changing a distance from the emitting part to the focal position of the aspherical lens and a distance from the focal position of the aspherical lens to a light collecting part. Using the aspherical lens makes the shape of the laser beam deformable in a desired shape so as to improve soldering efficiency.

The solutions disclosed in the prior art are partly structured in a very technically complex manner. This raises the cost of a laser beam machining device and also makes it susceptible to failure. Moreover, despite their complexity, these machines suffer from poor flexibility.

The problem addressed by the present invention is to provide an improved laser beam machining device. In particular, the flexibility of a laser beam machining device shall be improved although the complexity of such devices shall be kept low.

In accordance with the invention this problem is solved by a laser beam machining device of the type mentioned at the outset, wherein a distance between the lens and the light exit point and a distance between the lens and the machining point of the workpiece and a distance between the light exit point and the aforementioned machining point can be varied.

In accordance with the invention this problem is furthermore solved by a usage of a laser beam machining device, comprising a light exit point, which is provided for emitting unfocused laser light, a single lens after the light exit point in the direction of radiation, which focuses the laser light and is designed to guide the focused laser light onto a machining point of a workpiece, wherein a distance between the lens and the light exit point can be varied, for cutting said workpiece.

According to the invention, the convergence of the laser beam exiting from the lens and therefore both the focus position and also the depth of focus of the process beam can be altered. Shorter distances lead to a weakly convergent beam with a relatively large focal spot but also a relatively large depth of focus. Conversely, longer distances lead to a relatively small focal spot with a small depth of focus.

This affords a big advantage compared to the prior art. In the machining heads for laser beam machining which are commercially available nowadays, in particular for cutting using fibre lasers, there is the specific restriction that the depth of focus of the focused beam is generally less than 2 mm. This means that, in the case of workpieces of small thickness, high power densities and thus high feed rates can be achieved. However, in the case of workpieces of greater thickness from 4 mm, the focus point tolerances are low and the curve of the beam radius is no longer adapted to the workpiece dimension. The power densities and the feed rate thus decrease or have to be offset by higher laser powers. However, a higher laser power does not solve the problem of a relatively wide and "ugly" kerf and involves a considerable increase in cost.

The invention now allows lateral and axial magnification in the focal area of the process beam with the aid of axial displacement shafts with an individual lens for diffractive optimisation of the image. The beam geometry can thus be adapted continuously to the workpiece dimension without having to alter the beam quality or replace the process fibre. The invention thus offers not only a particularly simple structure of a laser machine, but also matches the laser power to the thickness of the workpiece to be machined.

Because a distance between the lens and the machining point of the workpiece (in particular a process beam exit point, and/or a distance between the light exit point and the aforementioned machining point) can be varied, the focus can be set independently of the adjustment of the depth of focus. For example, the end of a laser exit nozzle (for example a cutting nozzle) can be understood to be a process beam exit point, that is to say the last point of the laser beam which still lies inside the laser beam machining device. In this specific variation, the process beam exit point can be kept at a constant distance from the workpiece since the lens and/or light exit point are displaced inside the laser beam machining device, for example in a machining head thereof.

In particular, the laser light is guided directly onto the machining point, that is to say without intermediate positioning of further beam-shaping elements.

In accordance with the invention, inter alia the structure of a laser beam machining device is simplified considerably. The device can thus be produced in a more cost-effective manner and is also less susceptible to technical faults. In-depth tests have surprisingly shown that it may be sufficient for a single lens to influence the laser beam in order to prepare said beam for the material processing.

It is advantageous if an end of an optical fibre or a diode laser is provided as a light exit point. For example, the light of a $CO_2$ laser, an Nd:YAG laser or a diode laser can be guided towards the lens using an optical fibre. However, it is also conceivable for the light exit point to be formed by the end of a fibre laser. It would also be possible for the light exit point to be formed directly by a relatively advantageous diode laser.

For the sake of completeness, it is noted that the laser beam machining device naturally can comprise more than a single lens in total, for example for coupling the laser light into an optical fibre or for other optical systems.

Further advantageous embodiments and developments of the invention will emerge from description in conjunction with the drawings.

It is advantageous if the lens is aspherical. The laser beam can thus easily be prepared for material processing.

It is advantageous, if the moving range of the lens/of the light exit point is limited by the area illuminated by the laser beam being in a range from 25% to 100% of the lens area. In this way, effects caused by partial illumination of said lens, such as lens curvature, thermal lens and in the end collapse of the lens due to thermal overload may be avoided.

It is also advantageous, if the Strehl ratio is greater than 0.9 over the moving range of the lens/of the light exit point. The Strehl ratio (named by the physicist and mathematician Karl Strehl) is a measure of the optical quality of optical devices. It is defined as the ratio of the maximum intensity of a point source in the image plane to the theoretical maximum intensity of perfect optical system. By keeping the Strehl ratio above 0.9 over the moving range/magnification range of the beam machining device, high quality cuttings can be obtained.

It is particularly advantageous if the aspheric surfaces of said lens are shaped with an even asphericity. The asphericity usually is given by a formula defining the spherical curvature plus a polynomial. According to this variant of the beam machining device, said polynomial just comprises even terms, i.e. $a_2{*}x^2+a_4{*}x^4+\ldots$. The even asphericity is beneficial for an axially symmetric beam exit. In particular it may be defined in such a way that a Strehl ratio nearby 1 is provided in case of short focal distances because the aberrations tend to be relatively high there. By defining the asphericity in the way described above aberrations may be kept low over the whole moving range of the lens.

It is also advantageous if the light exit point is arranged in relation to the lens in such a way that the unfocused laser light contacts the lens directly. This variation of the invention is particularly simple in structure since only a single lens is arranged between the light exit point and the machining point, and in one specific embodiment of the invention only this lens alone is arranged as a single beam-shaping element.

A laser beam machining device which comprises a drive system designed to displace the light exit point and the lens synchronously over the same distance in relation to the machining point, in particular in relation to a process beam exit point of the laser beam machining device, is particularly advantageous. In this case merely the distance between the optical arrangement and the workpiece is thus altered, but without affecting the depth of focus of the laser beam.

As a most simple alternative the laser beam machining device comprises a drive system designed to displace the lens in a small range. In this setup only the focus position relative to the exit point can be varied while the depth of focus remains nearly constant.

In this regard it is particularly advantageous if the laser beam machining device has a first drive system for the joint displacement of the lens and the laser beam machining point, and a second drive system for changing the distance between the lens and the laser beam machining point. However, a drive system for the lens and a further drive system for the light exit point are also conceivable.

It is advantageous if said lens is made of ZnS (zinc sulphide). Lenses made of ZnS provide better thermal conduction and a higher refractive index compared to common glass lenses.

It is also advantageous if said lens and/or its holder is fluid cooled. In this way, the lens and/or its holder stays in shape even in case of high thermal loads caused by absorption of high power laser light. A fluid may be a liquid or gaseous medium.

It is furthermore advantageous if a transparent disc, in particular a glass disc or a plastics material disc, is arranged after the lens in the direction of radiation. The lens can thus easily be protected against weld and cut spatters as well as against smoke. The transparent disc is not provided for beam shaping, but is basically planar. It can therefore be replaced in a cost-effective manner.

It is particularly advantageous if a space is provided between the transparent disc and the lens, and the lens and/or the light exit point can be moved by introducing a fluid into this space and extracting it therefrom. In this variation of the invention the lens and/or the light exit point can thus be displaced by a pneumatic or hydraulic drive system. If the light exit point is held steady, the distance between the lens and the light exit point can thus be changed. If, by contrast, the lens and the light exit point are displaceable and the volume between the two is kept constant, the lens and the light exit point can thus be displaced synchronously by introducing a fluid into the space between the transparent disc and the lens or extracting it therefrom. For example the process gas, which is often provided in any case for laser cutting and laser welding, can also be used for the aforementioned adjustment.

It is advantageous if a space is provided in a pressure-tight manner between the light exit point and the lens, and the lens and/or the light exit point can be displaced by introducing a fluid into this space or extracting it therefrom. Similarly to the aforementioned variations, the lens and/or the light exit point can be adjusted hydraulically or pneumatically. The distance between the lens and the light exit point is changed.

Furthermore, it is advantageous if a space is provided in a pressure-tight manner before the light exit point in the direction of radiation and the light exit point is displaceable by introducing a fluid into this space or extracting it therefrom. In this variation of the invention, the lens and/or the light exit point can again be displaced by a pneumatic or hydraulic drive system. If the lens is held steady, the distance between the lens and the light exit point can thus be changed. If, by contrast, the lens and the light exit point are displaceable and the volume between the two is kept constant, the lens and the light exit point can thus be displaced synchronously by introducing a fluid into the gap before the light exit point or extracting it therefrom. For example a process gas, which is often provided in any case for laser cutting and laser welding, can again be used for the aforementioned adjustment.

It is advantageous if a light-sensitive sensor is arranged in the region of a stray light cone of the lens. The beam properties and/or properties of the lens can thus be determined without having to introduce a sensor into the high-energy laser beam for this purpose and without having to couple out some of this beam and guide it onto a sensor. The stray light, which is not actually used for laser beam machining, can thus still advantageously be utilised.

In this regard it is particularly advantageous if the laser beam machining device according to the invention comprises an evaluation unit which is connected to the sensor and is designed to carry out the following steps:

detect an actual curve of the luminous intensity measured by the sensor during a movement of the light exit point and/or of the lens, compare this actual curve of a used lens with a setpoint curve of an ideal lens and trigger an alarm if the deviation between the setpoint curve and the actual curve exceeds a predefinable threshold.

In this variation the stray light cone is moved over the sensor, which detects this curve of luminous intensity over the cross-section of the stray light cone. This makes it possible to draw a conclusion as to the beam properties, but in particular also as to the properties of the lens. For example, depressions and bumps on the lens, for example caused by weld spatters and deposits, lead to an irregular actual curve. If this deviates too strongly from a setpoint curve of an ideal lens, this is a strong indication of the fact that the lens has become unusable.

It is advantageous if the full exit angle of the unfocused laser light at the light exit point is less than 90°, in particular less than 60° and better still less than 45°. Light sources can thus be used in which no excessively high demands are placed on the quality of the exiting beam. The laser beam machining device can therefore be produced in a cost-effective manner.

It is lastly advantageous if the laser beam machining device comprises a machining head in which the light exit point and the lens are arranged. The machining head forms each part which is arranged at the end of the kinematic drive system and from which the laser beam exits. If the aforementioned components are incorporated in the machining head, a machining head is formed which is particularly more technically simple and therefore less susceptible to failure.

The above embodiments and developments of the invention can be combined in any manner.

The present invention will be described in greater detail hereinafter with reference to the embodiments illustrated in the schematic figures of the drawings, in which.

In the figures, unless stated otherwise, like and similar parts are denoted by like reference numerals, and functionally like elements and features are also denoted by like reference numerals.

Figure 1:
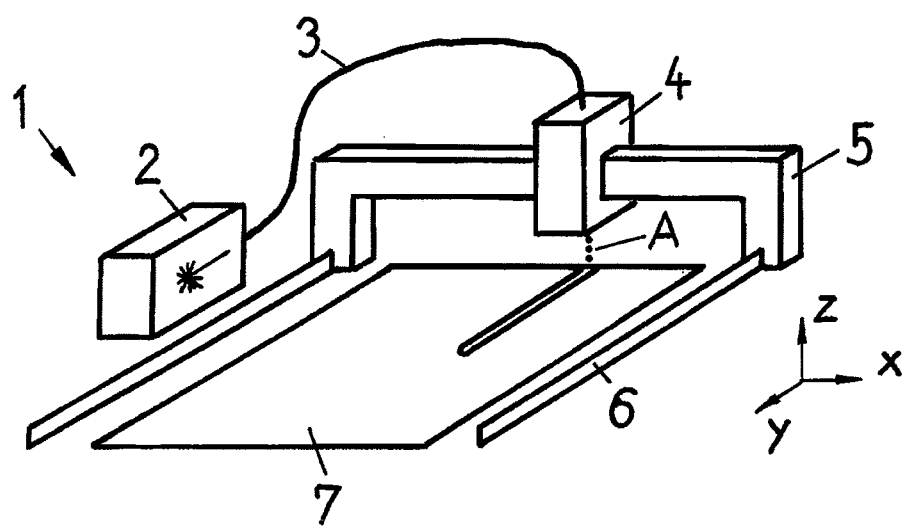
FIG. 1 is a schematic view of the laser beam machining device according to the invention.

FIG. 1 shows an exemplary laser beam machining device 1, for example which comprises a diode laser 2, an optical fibre 3, a machining head 4, a gantry slide 5 and rails 6, and machines a workpiece 7.

The laser beam machining device 1 illustrated in FIG. 1 functions as follows:

The machining head 4 can be moved in a manner known per se along the gantry slide 5 in the direction x, and said gantry slide can in turn be moved along the rails 6 in the direction y so that the machining head 4 can carry out any movement in the x-y plane. With the aid of the diode laser 2, laser light is generated which is guided to the machining head 4 by means of an optical fibre, where it is then directed onto the workpiece 7. The laser beam A then contacts the workpiece 7 at the machining point. During the movement of the machining head 4, the workpiece 7 is then cut along the path travelled by the machining head 4, thus producing a kerf.

Figure 2:
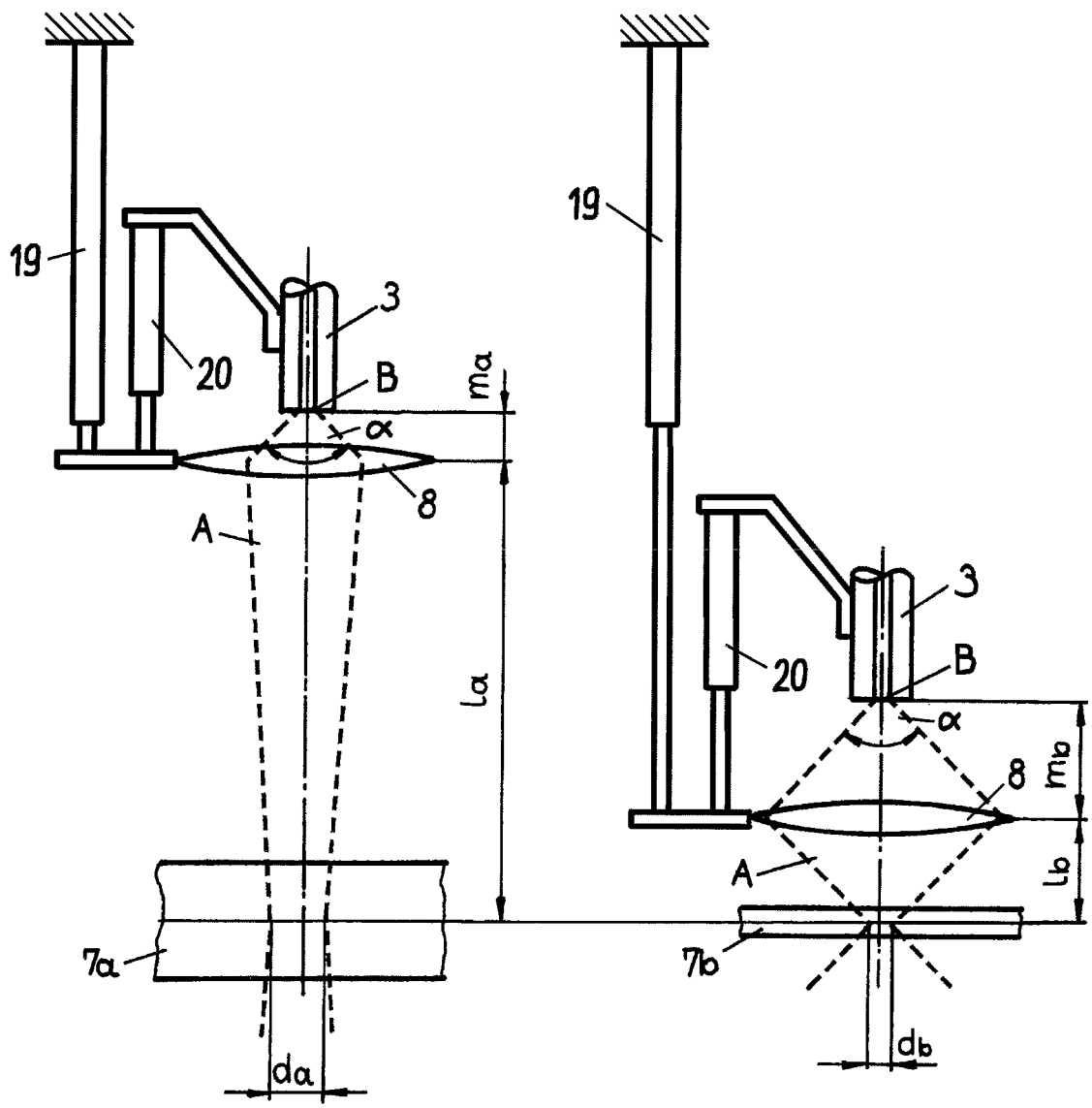
FIG. 2 is a schematic view showing how the laser beam is guided to workpieces of different thickness using the arrangement according to the invention.

FIG. 2 shows a schematic view of a detail from the machining head 4, specifically the end of the optical fibre 3, which forms a light exit point B, and a lens 8. The laser beam machining device 1 thus comprises a light exit point or outlet B, which emits unfocused laser light A, as well as a single lens 8, which focuses the laser light A and guides it onto a machining point of the workpiece 7. In this specific example, the exit angle α from the light exit point B is 90°. The light exit point B is arranged in relation to the lens 8 in such a way that the unfocused laser light A contacts the lens 8 directly. Furthermore, it is assumed in the example that the lens 8 is aspherical, however the use of a plano-convex lens for example is also possible.

The aspherical lens preferably consists of ZnS, plastics material or an optical glass (for example fused silica, Suprasil). The lens 8 is advantageously water-cooled, in particular at a laser power of more than 2 kW. There is preferably also compressive force compensation on the incident side of the lens 8.

As illustrated in FIG. 2, the light exit point B may be formed by an end of an optical fibre 3, in particular the end of a fibre laser. However, it is also conceivable for the light exit point B to be formed by a diode laser (not shown), which is preferably arranged directly in or over the machining head 4 of the laser beam machining device 1.

In a specific test a multimode step-index fibre was used which has a numerical aperture NA>0.08 and generates a multimode beam with the beam propagation factor (describes the focusability of lasers in accordance with ISO standard 11146) $M^2>=2$. The laser beam A coupling out from the fibre was focused by a single aspherical lens 8, wherein this image was optimised in terms of diffraction. Of course, these figures are to be considered as purely illustrative. Other values may also lead to satisfactory results.

The left-hand image shows the optical fibre 3 and the light exit point B and the lens 8 during machining of a thick workpiece 7a, while the right-hand image shows machining of a thin workpiece 7b.

In a particularly advantageous embodiment of the invention the light exit point B and the lens 8 are displaced in such a way that a relatively weakly converging beam is directed onto the thick workpiece 7a during machining thereof. A relatively large focal spot of diameter $d_a$ is indeed thus selected, although owing to the weak convergence of the beam a large depth of focus thereof is produced, which is advantageous for machining thick workpieces 7a.

Conversely, when machining the thin workpiece 7b, the light exit point B and the lens 8 are set in such a way that a relatively strongly converging beam is directed onto the workpiece 7b. Owing to the strong convergence of the beam a small depth of focus thereof is indeed produced, although only a relatively small focal spot of diameter $d_b$ is produced, which is advantageous for machining thin workpieces 7b.

The distance $m_a$, $m_b$ between the lens 8 and the light exit point B and the distance $l_a$, $l_b$ between the lens 8 and the machining point of the workpiece 7 and/or the distance between the light exit point B and the aforementioned machining point can thus be varied.

In a particularly advantageous embodiment, the laser beam machining device 1 according to the invention also comprises a drive system which is designed to displace the light exit point B and the lens 8 synchronously over the same distance in relation to the machining point. For example, the laser beam machining device 1 may comprise two linear movement shafts/linear motors 19, 20 parallel to the axis of radiation. Both linear movement shafts/linear motors 19, 20 are fixed to a lens holder on their lower end in this example. The first shaft/linear motor 19 additionally is fixed to a support of the laser machining apparatus, e.g. a part of the laser machining apparatus, which stays in a more or less constant distance to the work piece 7. The first shaft/linear motor 19 thus moves the light exit point B together with the lens 8 and changes the working distance $l_a$, $l_b$.

The second shaft/linear motor 20 is fixed to the lens holder on its lower end and to a fibre holder on its upper end. The second shaft/linear motor 20 thus changes the distance $m_a$, $m_b$ between the light exit point B and the lens 8, whereby both the focus position and the depth of focus of the laser beam A are changed.

If the distance $m_a$, $m_b$ between the light exit point B and the lens 8 is shortened, the working distance $l_a$, $l_b$, depth of focus and focus radius are thus increased. The second shaft/second linear motor 20 therefore has to compensate for the greater working distance $l_a$, $l_b$ so that the focus again lies in the workpiece 7.

In this example the linear movement shafts/linear motors 19, 20 may be embodied as pneumatic or hydraulic cylinders or as electric spindle drives for example. However, other kinds of linear motors are applicable as well such as synchronous or asynchronous linear motors or gear rod drives.

In addition it has to be noted, that the linear movement shafts/linear motors 19, 20 may be arranged in a different way. For example the first shaft/linear motor 19 can be arranged between the fixed machine support and the fibre holder, whereas the second shaft/linear motor 20 again is fixed to the lens holder on its lower end and to a fibre holder on its upper end. Furthermore it is possible that the first shaft/linear motor 19 is arranged between the fixed machine support and the lens holder and the second shaft/linear motor 20 is arranged between the fixed machine support and the fibre holder.

The invention aims to produce the imaging (focusing), for example of a fibre laser beam, through a single lens 8 (singlet lens, preferably ZnS) displaceable in the z direction, wherein each change to the working distance $l_a$, $l_b$ for the purpose of obtaining the desired focus position is compensated for by a mechanical device. The imaging is optimised in terms of diffraction over the movement area of the lens 8 and achieves a lateral and longitudinal magnification area of the fibre core illuminated by the laser beam A. In the imaged (focused) beam A, a super-Gaussian distributed intensity is thus to be achieved with maximum depth of focus.

In a variation of the invention, it is possible to dispense with a protecting glass owing to the large distance to the workpiece. In this regard, the integration of a 90° beam deflection is advantageous with particularly large working distances.

It is advantageous, if the moving range of the lens 8 of the light exit point B is limited by the area illuminated by the laser beam A being in a range from 25% to 100% of the lens area. In this way effects caused by partial illumination of said lens 8, such as lens curvature, thermal lens and in the end collapse of the lens 8 due to thermal overload may be avoided. It is also advantageous, if the Strehl ratio is greater than 0.9 over said moving range so as to high quality cuttings. It is also particularly advantageous if the aspheric surfaces of said lens are shaped with an even asphericity so as to keep aberrations low.

Two specific case examples will be detailed hereinafter which were calculated using a software for designing optical systems (for example ZEMAX):

CASE EXAMPLE 1

50 µm process fibre, aspherical lens made of ZnS, planar incident side, convex exit side with a radius of curvature of 90 mm, aspherical corrections 4th and 6th order.
a) small focus: working distance approximately 290 mm, fibre end/lens distance 90 mm, resultant focus radius approximately 54 µm, Rayleigh length (depth of focus) approximately 1.4 mm.
b) large focus: working distance approximately 780 mm, fibre end/lens distance 75 mm, resultant focus radius approximately 177 µm, Rayleigh length (depth of focus) approximately 15 mm.

CASE EXAMPLE 2

50 µm process fibre, aspherical lens made of ZnS, planar incident side, convex exit side with a radius of curvature of 60 mm, aspherical corrections 4th order.
a) small focus: working distance approximately 150 mm, fibre end/lens distance 65 mm, resultant focus radius approximately 38 µm, Rayleigh length (depth of focus) approximately 0.7 mm.
b) large focus: working distance approximately 465 mm, fibre end/lens distance 50 mm, resultant focus radius approximately 158 µm, Rayleigh length (depth of focus) approximately 12 mm.

Figure 3:
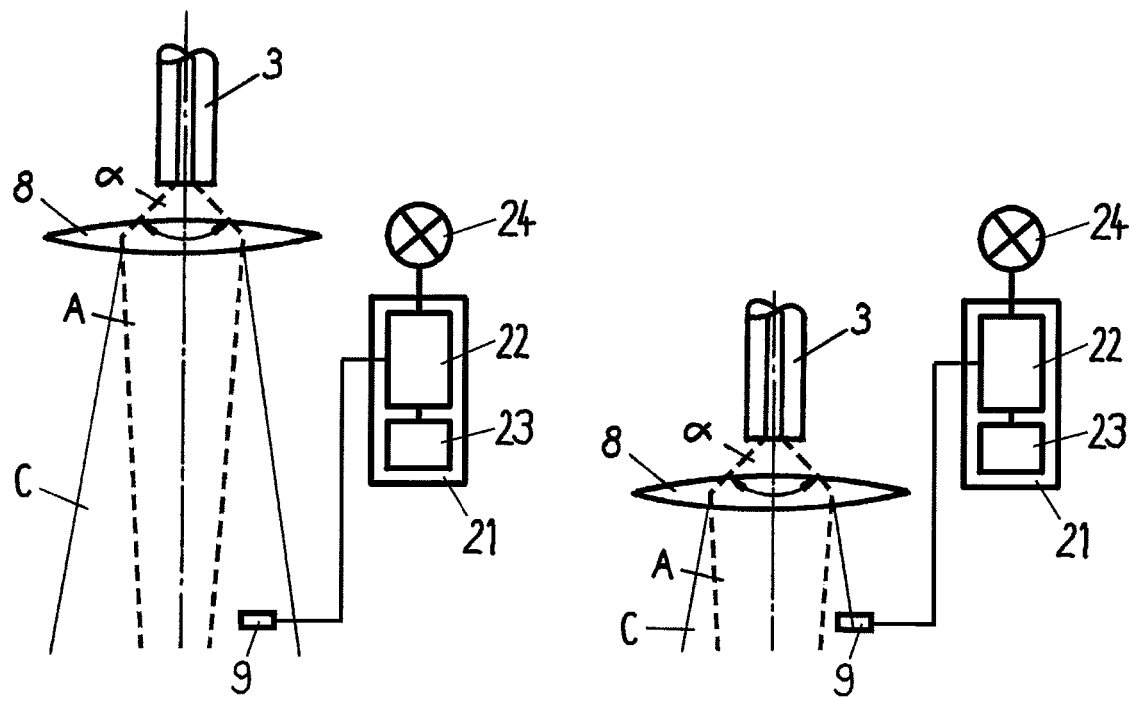
FIG. 3 is a schematic view of the arrangement according to the invention, in which a sensor is arranged in the stray light cone.

FIG. 3 now shows a further variation of the invention. A light-sensitive sensor 9 is arranged in the area of a scattered light cone C of the lens 8.

With a displaceable lens 8, in particular with such a lens made of multispectral ZnS, a scattered radiation is produced with the transmission of the laser beam A through the substrate and is emitted in a cone C about the process beam. The scattered output and the scattering angle are dependent both on the scatter process in the lens substrate and on the shape of the beam exit side of the lens 8.

Figure 4:
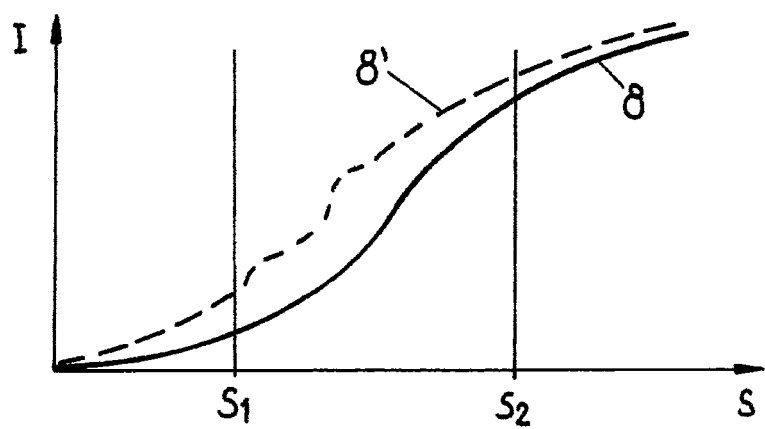
FIG. 4 shows an example of an intensity curve recorded by the sensor from FIG. 3.

By displacing the light exit point B and/or the lens 8, the scattered light cone C can now be displaced in relation to the (fixed) sensor 9 so that said sensor can detect an intensity curve over the cross-section of the scattered light cone C (of course the sensor 9 could also be displaceable, however). FIG. 4 shows such an exemplary curve for the lens 8, wherein the lens intensity I is shown over the path of displacement s of the light exit point B and/or of the lens 8. The displacement position $s_1$ denotes the position illustrated in the right-hand image of FIG. 3, while $s_2$ denotes the position illustrated in the left-hand image of FIG. 3. In addition to the continuous curve for the ideal lens 8, a dashed curve for a lens 8' which is not ideal is also illustrated. For example, this is contaminated and/or deformed by the spatter from the workpiece 7. A curve deviating from the ideal curve is accordingly given for the light intensity I and, as illustrated, may also exhibit indentations.

An evaluation unit 21 is now connected to the sensor 9 and is designed to carry out the following steps:

detect an actual curve of the luminous intensity I measured by the sensor 9 during a movement of the light exit point B and/or of the lens 8, compare this actual curve of a used lens 8' with a setpoint curve of an ideal lens 8 and trigger an alarm if the deviation between the setpoint curve and the actual curve exceeds a predefinable threshold.

A lens 8' rendered unusable owing to excessive contamination or for other reasons can thus be identified and replaced.

This variation of the invention aims, for example when imaging a fibre laser beam through a single lens 8 (singlet lens, preferably ZnS) which is displaceable in the z direction, to monitor the lens 8 with the aid of its scattered light properties and the birefringence-induced second harmonics generation (weak output in the green spectrum range) over the service life of the lens. For this purpose the arrangement is selected in such a way that the edge of the scattered light cone C passes through the sensor 9 when the lens 8 moves. The intensity curve of the scattered light over the path of movement in the z direction carries the information regarding the actual state of the lens 8 in relation to the curve when new. Further, a distinction can thus be made between a scattered light signal and a process light signal.

The coating for dereflecting the lens 8 in the laser wavelength is partly reflective on the lower lens side for the wavelength of the second harmonics. Information regarding the optical state can be read from the detection of the intensity of the reflected light of the second harmonics along the path of movement in the z direction of the lens 8.

With a linearly displaceable lens 8 and a sensor 9 arranged in the beam path, the curve of the scattered light signal can be recorded as described since the boundary of the scattered light cone passes over the sensor 9. If the process beam contacting the lens 8 is kept constant, changes to the lens 8 can be read from the scattered light signal thus recorded.

Alternatively, in particular with use of multispectral ZnS as a lens substrate, the generated second harmonics can be used to detect the state of the lens. Because the lens 8 dereflects in the case of the process beam wavelength, the light of the second harmonics at half wavelength of the laser beam A is only reflected in part on the surface of the lens. The proportion of exiting light of the second harmonics can also be detected and used to analyse the state of the lens.

To intensify the detection signal of the second harmonic, moreover the upper coating may be weakly partly reflective and the lower coating highly reflective for the second harmonic. Thus, the light of the second harmonic preferably is reflected upwards. However, the coatings may be attached to the lens 8 in reversed order, so that light of the second harmonic is reflected downwards. Because ZnS deflects laser light downwards, two signals may be obtained from the lens 8 at the same time, if sensors 9 of different spectral sensitivity or filters are used. Thus, the lens 8 sends two signals downwards and one signal upwards in total, which may be fed to sensors 9 and used for detecting the quality of the lens 8.

With a constant distance between the light exit point B and the lens 8, both are advantageously moved by the stroke s while the position of the sensor 9 remains the same. The sensor signal l(s) is the response function of the lens 8 in the scattered light, which is different with different states of the optical system.

The evaluation unit 21 comprises a central processing unit 22 and a memory 23 in this example. The central processing unit 22 is connected to the sensor 9 to get the actual curve of the luminous intensity I and to compare it with the setpoint curve of an ideal lens 8 stored in the memory 23. If the deviation between the setpoint curve and the actual curve exceeds a predefinable threshold, the alarm lamp 24 is activated in this example. The central processing unit 22 and the memory 23 may be discrete parts on a printed circuit board. However, the central processing unit 22 and the memory 23 may be integrated in a single device, e.g. in a microcontroller. Furthermore the evaluation unit 21 may be embodied as an application specific integrated circuit (ASIC). Of course the alarming device may be embodied in a different way, e.g. as a loudspeaker.

Figure 5:
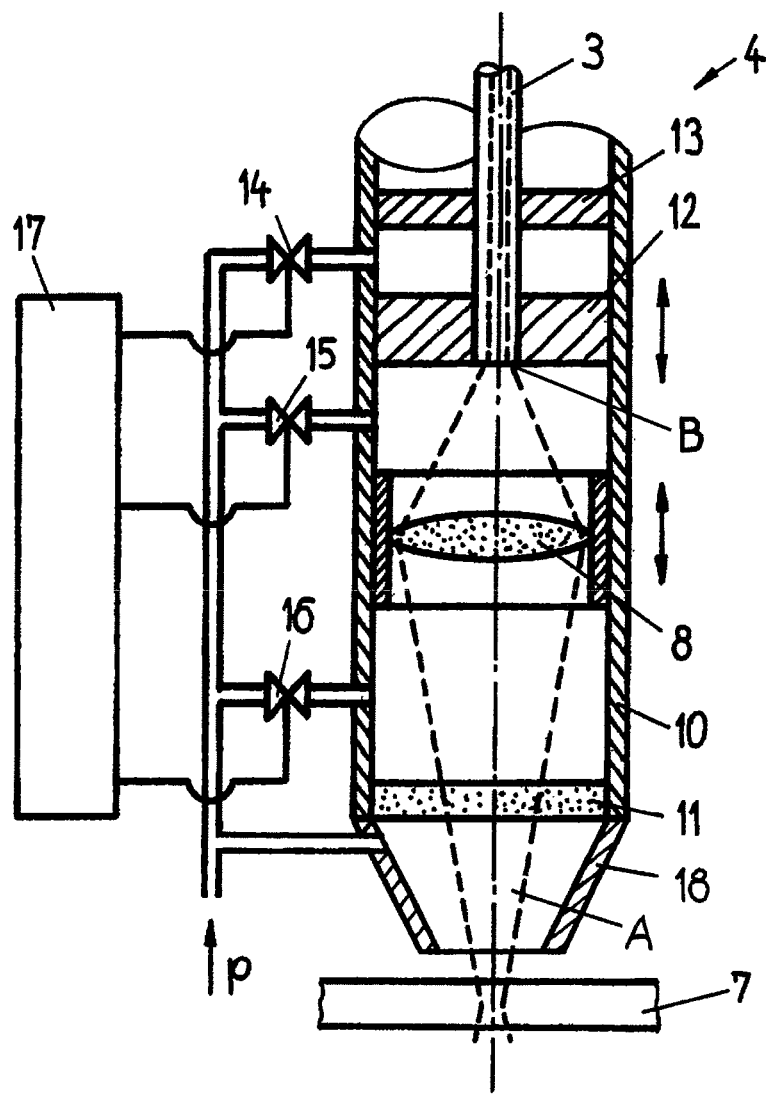
FIG. 5 shows a variation of the invention, in which the lens and the light exit point can be adjusted pneumatically or hydraulically.

FIG. 5 now shows a further variation of the invention. The machining head 4 of the laser beam machining device 1 is basically formed by a tube 10 which is closed at the lower end in a pressure-tight manner by a transparent disc, in this case by a glass disc 11. The displaceable lens 8 is located above. The glass disc 11 is thus arranged after the lens 8 in the direction of radiation. A displaceable piston 12 is arranged above the lens 8, to which piston the end of the optical fibre 3 is fixed. This is ultimately guided in a pressure-tight manner through a cover 13.

The following is thus provided:

a pressure-tight space between the glass disc 11 and the lens 8, whereby the lens 8 and/or the light exit point B can be displaced by introducing a fluid into this space or extracting it therefrom, a pressure-tight space between the light exit point B and the lens 8, whereby the lens 8 and/or the light exit point B can be displaced by introducing a fluid into this space or extracting it therefrom, and a pressure-tight space before the light exit point B in the direction of radiation, whereby the lens 8 and/or the light exit point B can be displaced by introducing a fluid into this space or extracting it therefrom.

In order to control the positions of the lens 8 and the light exit point B, the arrangement comprises three controllable valves 14, 15, 16, which are pressurised with the pressure p. These valves 14, 15, 16 are controlled by an electronic control system 17. For the sake of simplicity, air relief valves have been omitted in the example illustrated.

In this example it is assumed that the process gas is used as gas for adjusting the light exit point B and the lens 8, which process gas is also used for cutting or welding. For this purpose a gas nozzle 18 is also supplied with the gas. However, it would also be conceivable to use two different media for the valves 14, 15, 16 and the gas nozzle 18, or to dispense completely with the gas nozzle 18.

If, for example, the valve 14 is now opened and the space between the light exit point B and the lens 8 is deaerated/depressurized (subjected to pressure reduction), the distance between the light exit point B and the lens 8 will thus be reduced. If, instead, the space between the lens 8 and the glass disc 11 is deaerated, the light exit point B and the lens 8 will thus be moved synchronously along the same path. Similarly, the valves 15 and 16 may also be used to displace the lens 8 and/or the light exit point B. However, FIG. 5 shall just demonstrate the possibilities to adjust a laser beam machining device by means of fluids. Of course any kind of fluid, that means gaseous and liquid fluids, may be used to adjust the machining device by applying positive or negative pressures. In an advantageous embodiment the fluid used for adjusting the machining device is also used as a coolant, e.g. for the lens 8.

FIG. 5 is of course provided merely to illustrate in principle how the light exit point B and the lens 8 may be displaced with the aid of a fluid, which may be liquid or gaseous. For this purpose, many constructional embodiments are conceivable which implement this principle and lie within the scope of routine considerations of a person skilled in the art. It is particularly advantageous if a process gas, which is pressurised in any case and which is required for cutting or welding, is used as a fluid and thus performs a dual function. In particular it is conceivable for the disc 11, which is planar on either side, to be arranged directly after the lens and to be displaceable together with the lens 8. The thermo-mechanical loading of the disc member by absorption of the laser light thus remains practically unchanged and minimal at high laser powers at any distances $m_a$, $m_b$, $l_a$, $l_b$.

It is also conceivable that individual chambers are not filled and deaerated with the aid of a valve, but instead are closed in a self-contained manner and thus form a gas pressure spring. For example, if the valve 16 is omitted, the lens 8 can thus be pressed downwards against the resistance of the gas pressure spring by increasing the pressure above the lens 8. Of course, other types of spring may also be used, for example helical springs.

The specific feature of the embodiment illustrated in FIG. 5 is that the interior of the machining head 4, in which the beam path also extends, is part of the drive means. It is thus used twofold, more specifically for driving and for guiding the laser beam. In other words, the laser beam passes through the drive fluid(s). In the embodiment the fluid(s) act directly, from both sides, on the lens 8 or the lens support and on the laser exit point or on the piston 12 maintaining the laser exit point. The drive fluids therefore take on a number of functions: driving, cleaning and cooling of the lens and the other components.

Instead of a common pressure line which is pressurised with the pressure p, it is also possible to pressurise each of the separate spaces or chambers between the transparent disc 11 and the lens 8, between the lens 8 and the piston 12 and between the piston 12 and the cover 13 with a variably adjustable pressure via separate pressure lines in each case. Greater versatility and greater accuracy can thus be achieved when moving the system components, specifically the sole movement of the lens, the sole movement of the laser exit point or the joint movement of the lens and laser exit point. The pressure differences between the fluids in the individual spaces, which fluids move the system components, can be set and adjusted precisely. If necessary, the individual spaces can also be charged with different gases by separate gas feeds.

Compared to the prior art, substantial simplifications, in particular a saving in space, longer service life and simple maintenance are produced by the type of drive. In addition, no complicated compensation means which require a pressure compensation are necessary, particularly since the spaces according to the invention are sealed relative to one another and to the outside environment and in any case can be pressurised or finely adjusted by fluid pressure (for example gas or liquid) as desired.

Figure 6:
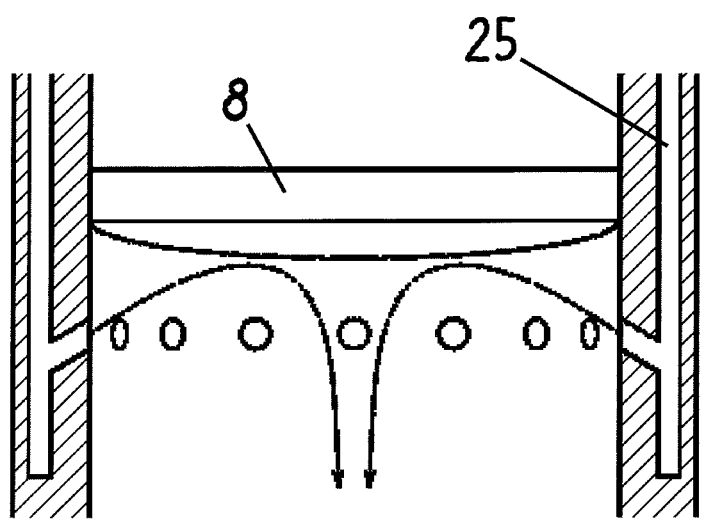
FIG. 6 shows a gas cooling system for a lens.

FIG. 6 finally shows an exemplary gas cooling system for a lens 8, in particular for a lens 8 made of ZnS. As can be seen in FIG. 6 cooling gas or air flows through a plurality of radial ducts 25 and is directed onto the bottom side of the lens 8. Thus, an efficient cooling of the lens 8 can be provided. Advantageously the gas—after it has cooled the lens 8—is also used for the cutting or welding process performed by the laser.

It is lastly noted that the variations illustrated only represent some of the many possibilities for the laser beam machining device 1 according to the invention, and should not be drawn upon to limit the field of application of the invention. A person skilled in the art may adapt the present invention to his requirements on the basis of the considerations described herein, without departing from the claimed scope of protection of the invention.

In particular the laser beam machining device 1 presented is not only adapted for laser cutting, but also for laser welding.

Of course, the invention is also not limited to portal robots as illustrated in FIG. 1, but can also be applied to industrial robots which generally allow movement in all six degrees of freedom. Since, in such case, a machining head mounted on the robot arm can be moved away from the workpiece 7 "by default", it is possible to dispense with a specific adjustment for joint movement of the light exit point B and the lens 8 in the machining head 4.

Furthermore, it is noted that the figures of drawings are sometimes not to scale and are also rather simplified. An actual constructed laser beam machining device 1 may therefore contain more components than illustrated and can thus be constructed in a much more complex manner than is illustrated in the figures. Parts of the arrangements illustrated in the figures may also form the basis for independent inventions. In particular, the variations of the invention shown in FIGS. 3 and 5 may also each form an independent invention.

The following list of reference numerals and the technical teaching of the claims are considered to lie within the scope of the disclosure and disclose further details of the invention and the embodiments thereof to a person skilled in the art, either alone or in conjunction with the drawings.

LIST OF REFERENCE LABELS

1 laser beam machining device
2 diode laser
3 optical fibre
4 machining head
5 gantry slide
6 rail
7 workpiece
8 lens (ideal)
8' damaged lens
9 sensor
10 tube
11 glass disc
12 piston for optical fibre
13 cover
14, 15, 16 control valve
17 control system
18 gas nozzle
19 first linear movement shaft/first linear motor
20 second linear movement shaft/second linear motor
21 evaluation unit
22 central processing unit
23 memory
24 signal lamp
25 duct
A laser beam
B light exit point
C scattered light cone
∝ exit angle
$d_a$, $d_b$ diameter of the focal spot
I luminous intensity
$l_a$, $l_b$ workpiece/lens distance
$m_a$, $m_b$ lens/light exit point distance
s path of displacement
$s_1$, $s_2$ displacement positions
x, y, z coordinates

What is claimed is:

1. A laser machining apparatus comprising:
   a light exit outlet configured to emit a diverging laser light, an end of an optical fiber providing laser light to said light exit outlet;
   a single lens situated to receive said diverging laser light emitted by said light exit outlet, said single lens separated by a first controllably-variable distance from said light exit outlet and configured to focus said diverging laser light received from said light exit outlet;
   a process beam exit point adjacent to a laser machining locus, said process beam exit point is disposed apart from said single lens, said process beam exit point is separated from said single lens by a second controllably-variable distance, said process beam exit point is separated from said light exit outlet by a third controllably-variable distance, the single lens directly focusing said diverging laser light received from said light exit outlet to said process beam exit point; and
   a drive system configured to controllably adjust said first controllably variable distance, said second controllably-variable distance, and said third controllably-variable distance, the drive system is configured to displace the light exit outlet and the single lens synchronously in relation to the laser machining locus when adjusting the second controllably-variable distance;
   wherein said drive system being operatively connected to said single lens and to said process beam exit point and further configured so that at least said first controllably-variable distance and said second controllably-variable distance can be varied independently of each other, a distance between said process beam exit point and said laser machining locus can be kept constant,
   whereby at least a focal length of the laser light at least partially focused by said single lens can be varied.

2. The laser machining apparatus as claimed in claim 1, wherein said single lens is aspheric.

3. The laser machining apparatus as claimed in claim 2, further comprising at least one aspheric surface on said single lens, said at least one aspheric surface being shaped with an even asphericity.

4. The laser machining apparatus as claimed in claim 1, wherein said single lens is made of ZnS.

5. The laser machining apparatus as claimed in claim 1, wherein said drive system is further configured to limit said first, second, and third controllably-variable distances to operational ranges that produce a Strehl ratio greater than 0.9.

6. The laser machining apparatus as claimed in claim 1, wherein said drive system is further configured to limit said first controllably-variable distance to an operational range that produces an illuminated area that is 25% to 100% of the area of said single lens.

7. The laser machining apparatus as claimed in claim 1, wherein said single lens is situated to directly receive diverging laser light from said light exit outlet.

8. The laser machining apparatus as claimed in claim 1, wherein an exit angle of the diverging laser light at said light exit outlet is less than 45°.

9. The laser machining apparatus as claimed in claim 1, wherein said drive system is operatively connected to simultaneously change said second and third controllably-variable distances an identical amount.

10. The laser machining apparatus as claimed in claim 1, further comprising a light sensor arranged to lie within a scattered-light cone of said single lens.

11. The laser machining apparatus as claimed in claim 10, further comprising an evaluation unit configured to detect an actual curve of luminous intensity measured by said light sensor and to compare it with a setpoint curve, said evaluation unit connected in operative communication with said light sensor.

12. A laser machining apparatus as claimed in claim 1 further comprising:
   a light-transmitting disc positioned between said single lens and said laser machining locus.

13. The laser machining apparatus as claimed in claim 1, wherein a junction of a first movement member with a holder associated with the light exit outlet is disposed above the light exit outlet in a movement direction of the holder.

* * * * *